US007609235B2

(12) United States Patent
Thebault et al.

(10) Patent No.: US 7,609,235 B2
(45) Date of Patent: Oct. 27, 2009

(54) MULTISCAN DISPLAY ON A PLASMA DISPLAY PANEL

(75) Inventors: Cedric Thebault, Villingen-Schwenningen (DE); Carlos Correa, Villingen-Schwenningen (DE); Sébastien Weitbruch, Mönchweiler (DE)

(73) Assignee: Thomson Licensing, Boulonge Cedex (FR)

( * ) Notice: Subject to any disclaimer, the term of this patent is extended or adjusted under 35 U.S.C. 154(b) by 406 days.

(21) Appl. No.: 10/424,827

(22) Filed: Apr. 28, 2003

(65) Prior Publication Data

US 2003/0206185 A1 Nov. 6, 2003

(30) Foreign Application Priority Data

May 4, 2002 (EP) ................... 02090164

(51) Int. Cl.
*G09G 3/30* (2006.01)
*G09G 3/28* (2006.01)

(52) U.S. Cl. .......................... 345/77; 345/60
(58) Field of Classification Search ......... 345/204–215, 345/690–699, 30–111
See application file for complete search history.

(56) References Cited

U.S. PATENT DOCUMENTS

| 5,497,172 | A | * | 3/1996 | Doherty et al. ............... 345/85 |
| 5,619,228 | A | * | 4/1997 | Doherty ....................... 345/693 |
| 5,731,802 | A | * | 3/1998 | Aras et al. ................... 345/692 |
| 5,986,640 | A | * | 11/1999 | Baldwin et al. ............. 345/596 |
| 6,052,112 | A | * | 4/2000 | Tanaka et al. ............... 345/596 |
| 6,151,011 | A | * | 11/2000 | Worley et al. ............... 345/692 |
| 6,404,440 | B1 | * | 6/2002 | Doyen et al. ................ 345/690 |
| 6,759,999 | B1 | * | 7/2004 | Doyen .......................... 345/63 |
| 6,985,164 | B2 | * | 1/2006 | Rogers et al. ............... 345/692 |

FOREIGN PATENT DOCUMENTS

| EP | 0833299 A1 | 4/1998 |
| EP | 0982708 A1 | 3/2000 |
| WO | WO 98/39762 | 9/1998 |

* cited by examiner

*Primary Examiner*—Srilakshmi K Kumar
(74) *Attorney, Agent, or Firm*—Robert D. Shedd; Harvey D. Fried; Patricia A. Verlangier

(57) ABSTRACT

In the field of video displaying the low video levels do not generate large area flicker. For displaying video sources with higher frame rate, it is therefore the idea of the invention, to extract from two corresponding pixels of two successive video frames a common portion ($V_x$) that will be displayed at a sub-frequency $f_v/2$ while the individual portions ($V_1'$, $V_2'$) of the corresponding pixels video are displayed at the correct high frequency $f_v$. The time period for displaying two frames is divided into three sub-groups. Two groups of sub-fields with similar sizes, for displaying the individual portions ($V_1'$, $V_2'$) and one group of sub-fields, called extra-codes, for displaying the common portion ($V_x$). This enables to eliminate large area flicker artifacts from PDPs, when displaying 50 Hz based video norms by using upconverted 100 Hz video sequences and to display real high frequency video on the PDP (ca. up to 120 Hz) without frame dropping.

10 Claims, 4 Drawing Sheets

Prior art

Multiscan concept

MULTISCAN DISPLAY ON A PLASMA DISPLAY PANEL

FIELD OF THE INVENTION

The present invention relates to a method for displaying video pictures, the video pictures consisting of pixels, the pixels being digitally coded in code words determining the lengths of the time period during which the corresponding pixel of the display is activated in one frame, wherein to each bit of a code word a certain activation duration is assigned, hereinafter called sub-field weight. Particularly, the present invention relates to a multiscan display mode in which low video levels (dark pixels) are displayed with a lower frame repetition rate than the high video levels (bright pixels).

BACKGROUND OF THE INVENTION

A Plasma Display Panel (PDP) utilizes a matrix array of discharge cells, which could only be "ON", or "OFF". Also unlike a CRT or LCD in which gray levels are expressed by analog control of the light emission, a PDP controls the gray level by modulating the number of light pulses per frame. This time-modulation will be integrated by the eye over a period corresponding to the eye time response.

For stationary pictures, this time-modulation repeats itself, with a base frequency equal to the frame frequency of the displayed video norm. As known from CRTs, a light emission with base frequency of 50 Hz, introduces large area flicker, which can be eliminated by the 100 Hz Upconversion technology for CRT TV receivers.

On the one hand this large area flicker artifact is reduced on a PDP since the duty cycle of light emission is longer. On the other hand since PDPs offer a larger size, even a reduced large area flicker becomes objectionable in terms of picture quality.

The solution, which is implemented in the European 100 Hz Upconversion TV technology, is to display twice as many frames/fields (by repeating each frame/field or by interpolating extra-frames/fields) in the same time period (20 ms), which corresponds to displaying a 100 Hz video. For clarification the term "frame" in TV technology means a complete video picture. The standard TV systems NTSC, PAL, SECAM use the interlace scanning so that a frame consists of two "fields" wherein the first field all odd video lines are displayed and in the second field all the even video lines are displayed. In the 50 Hz TV systems like PAL and SECAM a complete video picture is transmitted in a 40 ms time raster corresponding to a 25 Hz frame repetition rate. The fields are transmitted in 20 ms time raster corresponding to 50 Hz field repetition rate. The 100 Hz Upconversion technology mostly tackles the problem of large area flickering, but usually only by a pseudo frame/field repetition. This solution, as it is, is not really conceivable on the PDP since to display twice as many frames per second, twice as many sub-fields would be required (for the same quality).

Plasma displays are operated in progressive scanning mode in order to avoid a strong line flickering. From another European Patent Application of the applicant (EP-A-0 982 708) a solution is known how to create a pseudo-100 Hz component on the PDP, but this cannot be used to display the video frames coming from a video source reproducing video frames with a rate equal or higher than 75 Hz.

The same limitation occurs when handling high frequency video signals coming from PC applications. In this case PDPs usually drop some frames and display a video at 60 Hz, losing the advantages of the original high frequency video, and introducing some motion artifacts since some frames are constantly dropped.

SUMMARY OF THE INVENTION

It is the object of the present invention to provide a technique, which permits to display on a matrix display high frequency video sequences (for PC application mainly, which today use a frame rate of 75 Hz or higher), preserving the motion quality of the input sources.

According to the present invention this object is solved by the solution claimed in method claim 1 respectively apparatus claim 9. The inventive method is characterised by the steps of extracting a common portion of the video values for corresponding pixels in two or more successive video frames, displaying the common portion of the video values with a reduced frame repetition frequency and displaying the individual portions of the video values with the real frame repetition frequency of the video source.

In other words, this invention consists in a different sub-field organization, with a new principle of sub-field coding, which permits to display high vertical frequency ($f_v$ Hz) video.

The basic idea of this invention is that low levels, i.e. short activation durations of the pixels (dark pixels), do not generate flicker or motion artefacts (like judder), so they can be displayed at a sub frequency ($f_v/2$ Hz) while the rest of the video is displayed at the correct frequency ($f_v$ Hz).

To do this, the frame period may be tiled in three sub-groups:

Two groups of sub-fields with similar sizes, being included in a $1/f_v$ ms time frame (two sub-periods of the $f_v/2$ Hz frame rate) corresponding to a $f_v$ Hz component.

One group of sub-fields, called extra-frame or extra-codes, being included between the two previous sub-groups and corresponding to a $f_v/2$ Hz component for the low levels.

Further advantageous embodiments are apparent from the dependent claims.

BRIEF DESCRIPTION OF THE DRAWINGS

The present invention will now be described in more detail along with the attached drawings showing in.

DETAILED DESCRIPTION OF PREFERRED EMBODIMENTS

The following embodiments show best modes of applying the present invention.

As already discussed the large area flickering is a real problem in countries like in Europe using a 50 Hz frame repetition rate for TV transmissions. However, even in the case of 60 Hz TV systems like NTSC used in the United States and Japan, such a flickering will become disturbing in the future with the increase of the display size (since appearing on the periphery of the field of vision) as well as with the increase of the luminance values.

Figure 1:
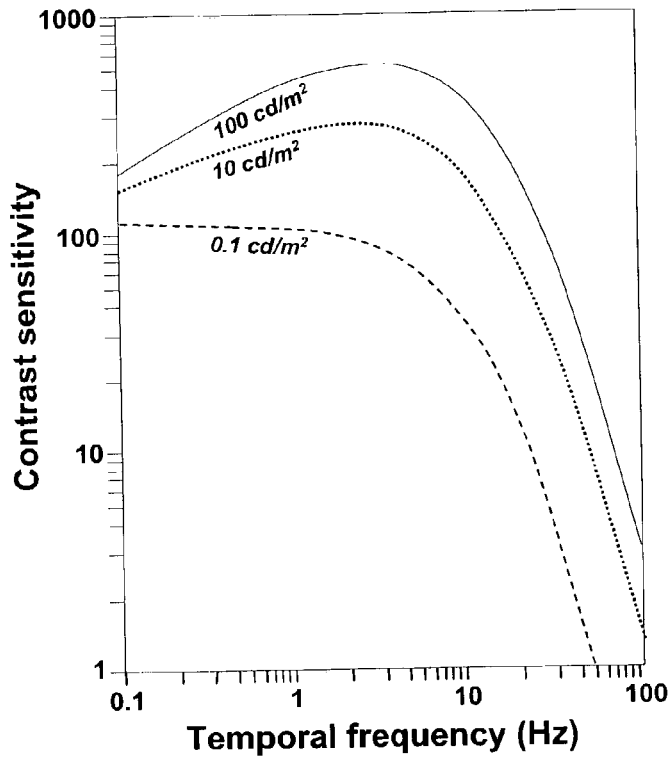
FIG. 1 the human eye temporal response characteristic.

FIG. 1 illustrates the human eye sensitivity versus temporal frequency of the video source for different luminance values. As can be seen clearly, the contrast sensitivity of the human eye decreases rapidly with decreasing luminance.

For these reasons the present concept for displaying high frequency video is not only an advantage for countries with 50 Hz TV technology but also for other countries (cf. the video output of a modern PC tends to 75 Hz or higher instead of 60 Hz video sequences).

The principle of the invention provides for possibilities of either doubling the frame repetition rate (when this one is lower than 60 Hz for example) or displaying a video with a high frame rate (greater than 60 Hz) by using a limited number of sub-fields but with an acceptable quality and all the advantages of a high frame rate video (less flicker, natural motion, etc.).

For this invention, the input video signal can be either a high frame rate video signal (for example 85 Hz from a PC graphic card or 100 Hz from an HDTV source TV), which can normally not be displayed by the PDP (because it requires too many sub-fields per unit of time) or a low frame rate video (for example 50 Hz), which generates large area flicker. In the last case (50 Hz), the frequency is doubled by repeating each frame, and so one obtains a high frequency video displaying.

The aim of the present invention is also to display this high frequency video signal, on a display where the light generation is done in small pulses, and the small pulses are grouped in sub-fields of different weights, like PDP, DMD, OLED, etc.

Figure 2:
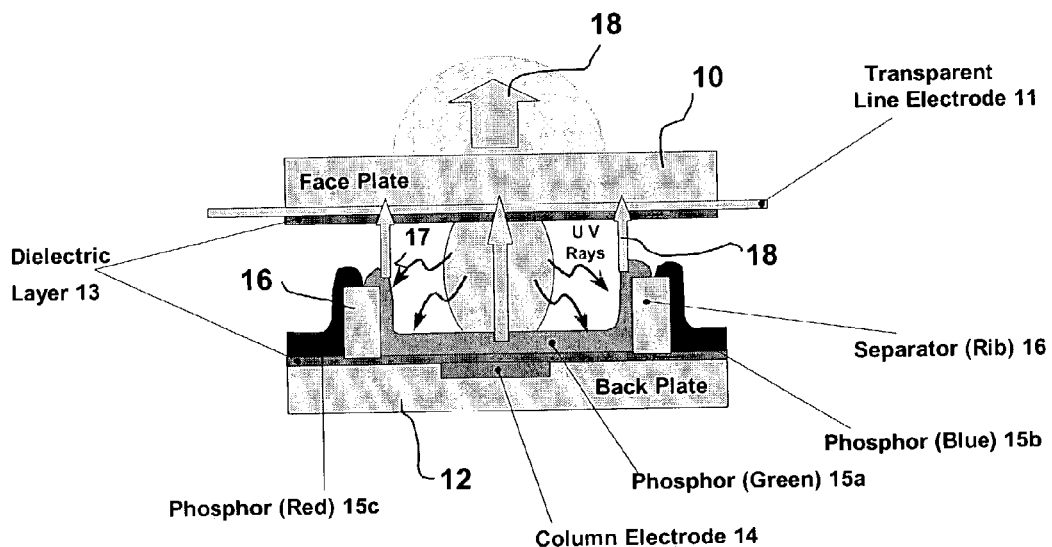
FIG. 2 shows the cell structure of the plasma display panel in the matrix technology.

The principle structure of a plasma cell in the so-called matrix plasma technology is shown in FIG. 2. Reference number 10 denotes a face plate made of glass, with reference number 11 a transparent line electrode is denoted. The back plate of the panel is referenced with reference number 12. There are 2 dielectric layers 13 for isolating face and back plate against each other. In the back plate column electrodes 14 are integrated being perpendicular to the line electrodes 11. The inner part of the cells consists of a luminance substance 15 (phosphorous) and separator 16 for separating the different coloured phosphorous substances (green 15a) (blue 15b) (red 15c). The UV radiation caused by the discharge is denoted with reference number 17. The light emitted from the green phosphorous 15a is indicated with an arrow having the reference number 18. From this structure of a PDP cell it is clear that there are three plasma cells necessary, corresponding to the three colour components RGB to produce the colour of a picture element (pixel) of the displayed picture.

The grey level of each R, G, B component of a pixel is controlled in a PDP by modulating the number of light pulses per frame period. The eye will integrate this time modulation over a period corresponding to the human eye response. The most efficient addressing scheme should be to address n times if the number of video levels to be created is equal to n. In case of the commonly used 8 bit representation of the video levels, a plasma cell should be addressed 256 times according to this. But this is not technically possible, since each addressing operation requires a lot of time (around 2 μs per line>960 μs for one addressing period>245 ms for all 256 addressing operations), which is more than the 20 ms available time period for 50 Hz video frames.

Figure 3:
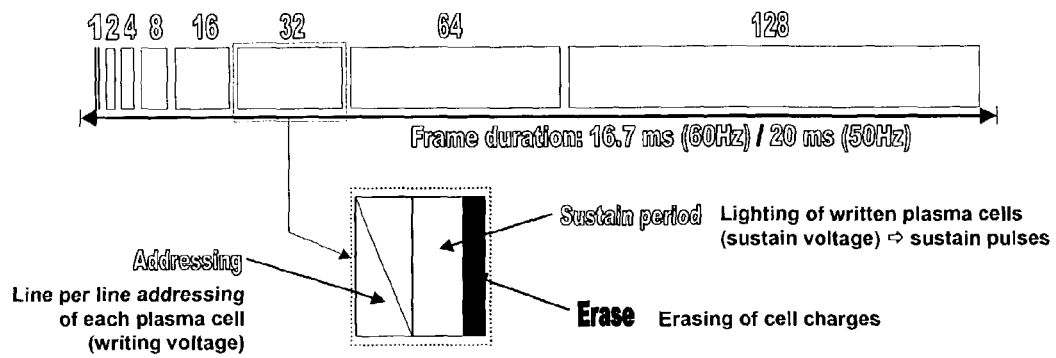
FIG. 3 shows the conventional ADS addressing scheme during a frame period.

From the literature a different addressing scheme is known, which is more practical. According to this addressing scheme a minimum of 8 sub-fields (in case of an 8 bit video level data word) are used in a sub-field organization for a frame period. With a combination of these 8 sub-fields it is possible to generate the 256 different video levels. This addressing scheme is illustrated in FIG. 3. In this figure each video level for each colour component will be represented by a combination of 8 bits with the following weights:

1/2/4/8/16/32/64/128

To realize such a coding with the PDP technology, the frame period will be divided in 8 lighting periods called sub-fields, each one corresponding to a bit in a corresponding sub-field code word. The number of light pulses for the bit "2" is double as for the bit "1" and so forth. With these 8 sub-periods it is possible, through sub-field combination, to build the 256 grey levels. The standard principle to generate this grey level rendition is based on the ADS (Address Display Separated) principle, where all operations are performed at different times on the whole display panel. At the bottom of FIG. 3 it is shown that in this addressing scheme each sub-field consists of three parts, namely an addressing period, a sustaining period and an erasing period.

In the ADS addressing scheme all the basic cycles follow one after the other. At first, all cells of the panel will be written (addressed) in one period, afterwards all cells will be lighted (sustained) and at the end all cells will be erased together.

The sub-field organization shown in FIG. 3 is only a simple example and there are very different sub-field organizations known from the literature with e.g. more sub-fields and different sub-field weights. Often more sub-fields are used to reduce moving artefacts and "priming" could be used on more sub-fields to increase the response fidelity. Priming is a separate optional period, where the cells are charged and erased. This charge can lead to a small discharge, i.e. can create background light, which is in principle unwanted. After the priming period an erase period follows for immediately quenching the charge. This is required for the following sub-field periods, where the cells need to be addressed again. So priming is a period, which facilitates the following addressing period, i.e. it improves efficiency of the writing stage by regularly exciting all cells simultaneously. The addressing period length can be equal for all sub-fields, also the erasing period length. However, it is also possible that the addressing period length is different for a first group of sub-fields and a second group of sub-fields in a sub-field organization. In the addressing period, the cells are addressed line-wise from line 1 to line n of the display. In the erasing period all the cells will be discharged in parallel in one shot, which does not take as much time as for addressing. The example in FIG. 3 shows the standard sub-field organisation with 8 sub-fields inclusive the priming operation. At one point in time there is one of these operations active for the whole panel.

The problem with high frequency video, is that as the frame period is reduced, less time is available for making light pulses thereby reducing the achievable contrast values or if the number of light pulses shall be preserved, the number of sub-fields need to be reduced thereby reducing the grey scale portrayal.

It is the idea of the present invention that as the human eye is more sensitive to flicker in the higher levels of luminance, the low levels can be displayed with a lower frequency (and so they require less sub-fields per unit of time) since they do not introduce judder or other motion artifacts. The low frequency component is extracted from two consecutive frames (which are identical if the frequency has been doubled). Owing to this, less sub-fields are required, and so the picture quality can be preserved.

In the following as an example the case of a real 100 Hz ($f_v$) video signal to be displayed on the PDP will be used, in order to simplify the exposition. But as said previously the same principle can be used with a frequency between 60 and 120 Hz.

So in order to display this 100 Hz ($f_v$) video signal:

First, the maximum low level, m, which will be displayed at 50 Hz ($f_v/2$), has to be chosen. Then from two consecutive frames for each pixel a low level (inferior or equal to m) has to be found; it can be the average of both video levels of the two frames, or simply a selection of one of the two low levels, e.g. the minimum of the maximum of both video levels. This selected low level will be coded with sub-fields named extra-codes in an extra-frame.

Then the maximum low level, m, is subtracted from the high video levels of the two frames. The new high video levels will be coded independently with a same code (sub-field weight gradation), but the code words control different sub-fields in the frame period.

In the following, the computation of the extra-frame and the sub-frames will be demonstrated.

Considering that the extra-codes of the extra-frame for two consecutive frames are displayed with a frequency twice lower than the rest of the video, their weight has to be twice as big than the one of the sub-groups: a value V (=1 Cd for the luminance) for the extra-codes of a 50 Hz picture is equivalent to a level V/2 (=½ Cd for the luminance) for one 100 Hz ($f_v$) component.

So for example if $V_1$ and $V_2$ are the values of the video levels of two consecutive 100 Hz frames, and m the maximal video level that will be displayed at 50 Hz ($f_v/2$), the value of the extra-code $V_X$ and the new values $V_1'$ and $V_2'$ of the two video levels, which will be coded in the sub-groups could be depending on the method we decide to use:

Method A:
  $V_x$ is the average of the low levels of the two frames. In this case:

$V_X = (\text{Min}(m, V_1) + \text{Min}(m, V_2))/2$ $V_1' = V_1 - \text{Min}(m, V_1) = \text{Max}(0, V_1 - m)$ $V_2' = V_2 - \text{Min}(m, V_2) = \text{Max}(0, V_2 - m)$ Method B:
  $V_x$ is the low level of the second frame. In this case:

$V_X = \text{Min}(m, V_2)$ $V_1' = V_1 - \text{Min}(m, V_1) = \text{Max}(0, V_1 - m)$ $V_2' = V_2 - \text{Min}(m, V_2) = \text{Max}(0, V_2 - m)$ Method C:
  Alternatively the low level of the first frame could be used. In this case:

$V_X = \text{Min}(m, V_1)$ $V_1' = V_1 - \text{Min}(m, V_1) = \text{Max}(0, V_1 - m)$ $V_2' = V_2 - \text{Min}(m, V_2) = \text{Max}(0, V_2 - m)$ Method D:
  Further alternatively in each case the smaller one of the two low levels could be used. In this case a comparison of the two low levels needs to be performed.

The low level, $V_X$ is coded with the sub-fields of the extra-frame, and the sub-frames, $V_1'$ and $V_2'$, with the sub-fields of the subgroups.

Figure 4:
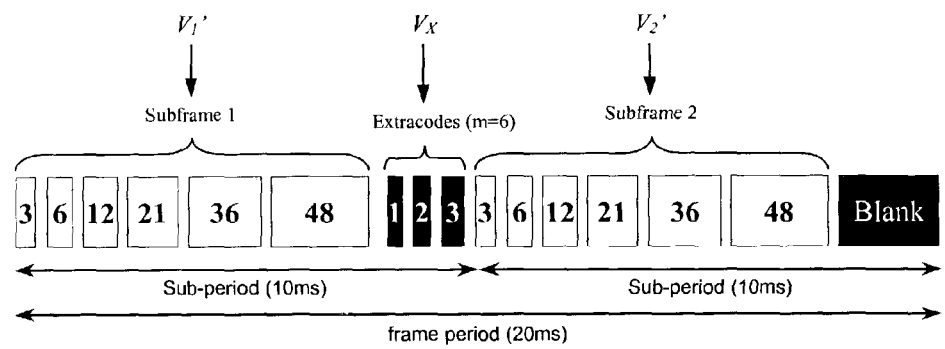
FIG. 4 an example of a sub-field organisation for sub-field coding according to one embodiment of the present invention.

The extra-frame is inserted between the two sub-frames, as it can be seen on FIG. 4.

A plasma display has a linear response characteristic. The CRT displays have the well known gamma function response characteristic. That's why the input video signal is gamma corrected before being transmitted to a CRT display. This gamma correction needs to be removed from the input video signal if the signal is input to a PDP. A gamma transformation is used for this purpose. The gamma transformation reinforces the input video signal non-linearly.

Like usual, in order to improve the picture quality, dithering can be used. Dithering is a well-known technique used to reduce the effects of quantisation noise due to a reduced number of displayed levels by adding artificial levels in-between two levels. The dithering technique is disclosed in greater detail in another application of the applicant, see WO 01/71702. For the disclosure of the present invention it is expressively referred to the WO document.

For the sub-field organisation according to the invention the picture quality can be enhanced by optimisation of dithering. The added dithering pattern is different for the three groups: if a cell-based dithering on 4 frames (4 masks: $M_1$, $M_2$, $M_3$, $M_4$) is used, then the patterns will be used as follows:

| Frame 1 (50 Hz) | | | Frame 2 (50 Hz) | | |
|---|---|---|---|---|---|
| Frame 1 | XCode | Frame 2 | Frame 3 | XCode | Frame 4 |
| $M_1$ | $M_1$ | $M_2$ | $M_3$ | $M_2$ | $M_4$ |
| Frame 3 (50 Hz) | | | Frame 4 (50 Hz) | | |
| Frame 5 | XCode | Frame 6 | Frame 7 | XCode | Frame 8 |
| $M_1$ | $M_3$ | $M_2$ | $M_3$ | $M_4$ | $M_4$ |

It is interesting to notice here that owing to this, the dithering is less perceptible as its frequency is higher than it would be without this invention (except for the extra-codes).

With the sub-field organisation shown in FIG. 4 used for encoding, 15 sub-fields are used to encode two 100 Hz frames, but the picture quality is good in the low levels as well as in the other parts of the gray scale.

Figure 5:
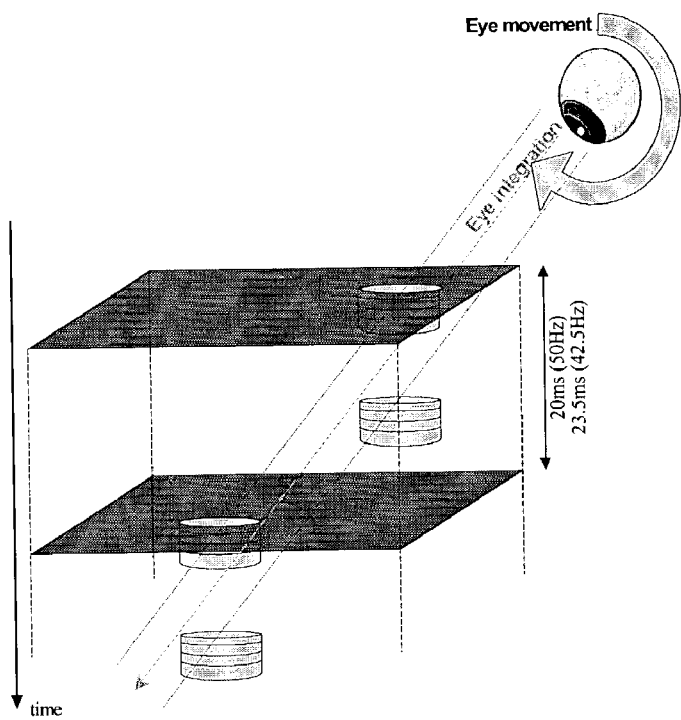
FIG. 5 a principle drawing for illustrating the multiscan concept.
Figure 5:
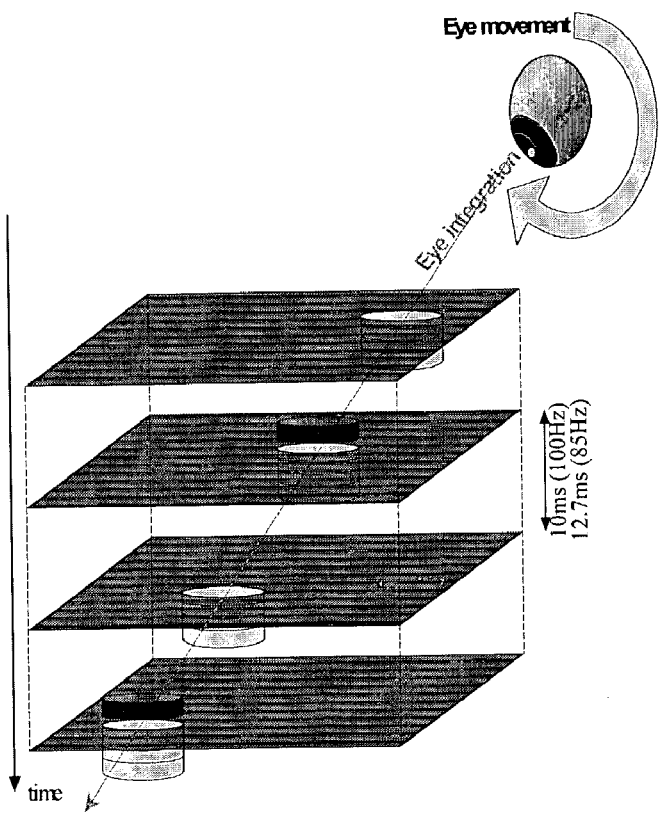

FIG. 5 illustrates the advantages of the present invention in comparison to the prior art solution according to EP-A-0 982 708 in the case of a white circle moving on a black background:

In the multiscan concept illustration the different slices represent the sub-fields for the sub-groups, and the slices above a black background layer the sub-fields for the extra group. Whereas in the prior art the pseudo frame repetition creates double edges, the multiscan concept respects the motion. In the example shown in the drawing, the extra-codes are extracted from the second sub-frame and as it can be seen, in this example this does not degrade the motion.)

Figure 6:
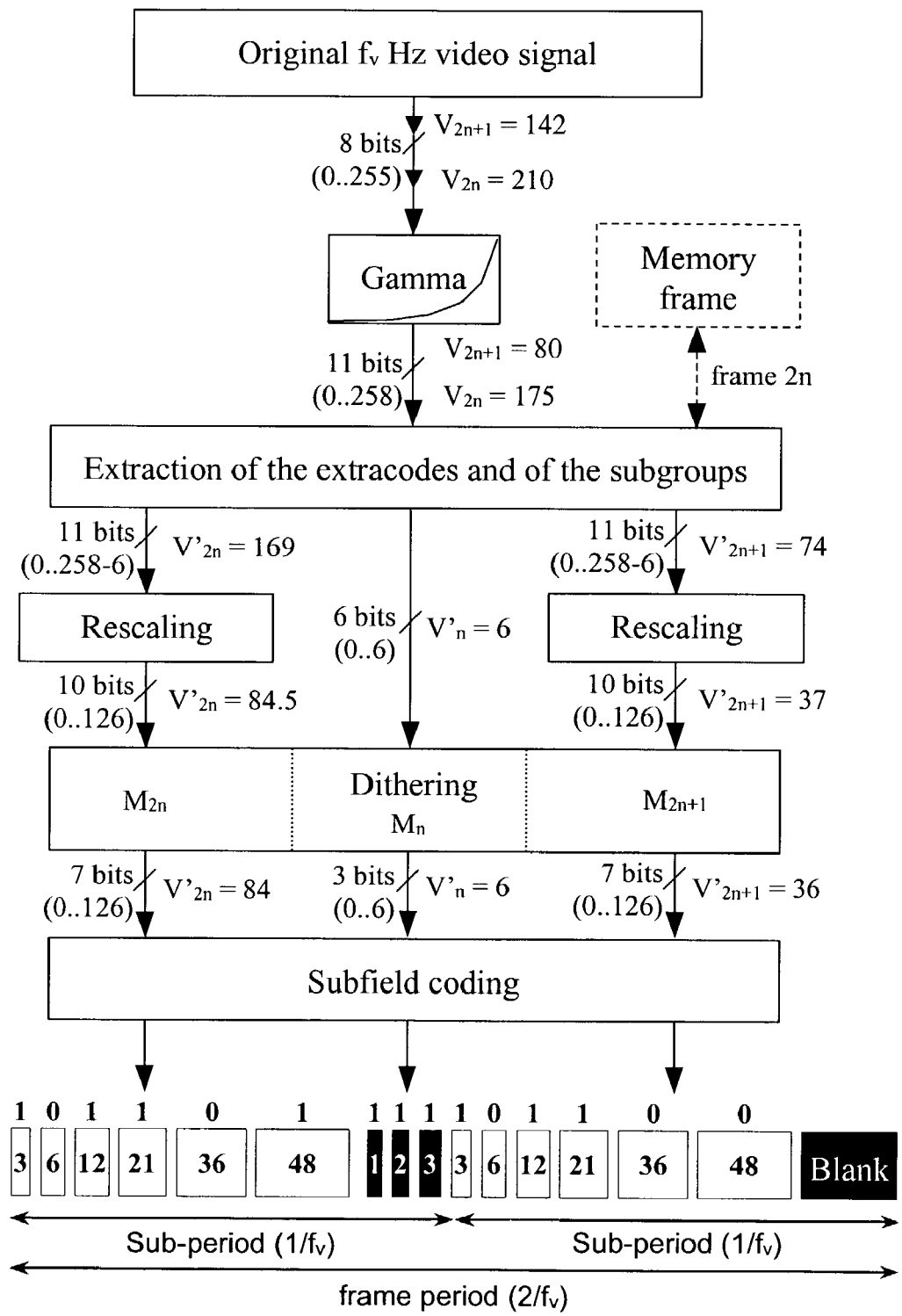
FIG. 6 a flow chart for implementing the multiscan concept according to the present invention.

To implement the invention in a PDP a flow chart of the sub-field coding process is presented in FIG. 6. In the example of FIG. 6 the maximum low level displayed in 50 Hz raster is m=6. The frame memory in FIG. 6 is optional since it is only necessary when the extra-codes are computed from the two 100 Hz frames.

An input video level $V_{2n}$ is equal to 210, and an input video level of the corresponding pixel of the following 100 Hz frame is equal to 142. After the gamma transformation with resealing to the maximum value 258, one obtains $258*(210/255)^2=175$ and $258*(142/255)^2=80$. The maximum value 258 is the sum over all sub-field weights in the sub-field organisation. The value 258 is selected for resealing because it allows to directly subtract the maximum low level m=6 from the input values. This is performed in the extraction step after the gamma transformation. Since the maximal value for the extra-codes is equal to 6 and the two video values are superior to 6, the extra-codes will be equal to 6. So one has to subtract the value 6 from both input values leading to 175−6=169 and 80−6=74. In the example of FIG. 6 these video values have to be rescaled to the value 126 (the sum of the sub-field weights of the sub-frames), giving 126*(169/252)= 84.5 and 126*(74/252)=37.

The code (3/6/12/21/36/48) for the sub-groups permits to encode all video-levels multiples of 3, the other levels are obtained by dithering. So finally a level of 84 is encoded.

If we decide to use the method D to compute the value of the extra-code:

If one of the input video values is less than the maximum low level 6, then the extracted extra-code will be equal to the low input video level. In the following resealing step the video value of the extra-code will be subtracted only from the high input video value. The low input video value remains unchanged and will be displayed solely with the sub-fields of the extra frame.

In case that both input video values are ≦6, the extra-code will also be extracted by determining the lowest value. The higher value will be subject of resealing and dithering as explained before.

Figure 7:
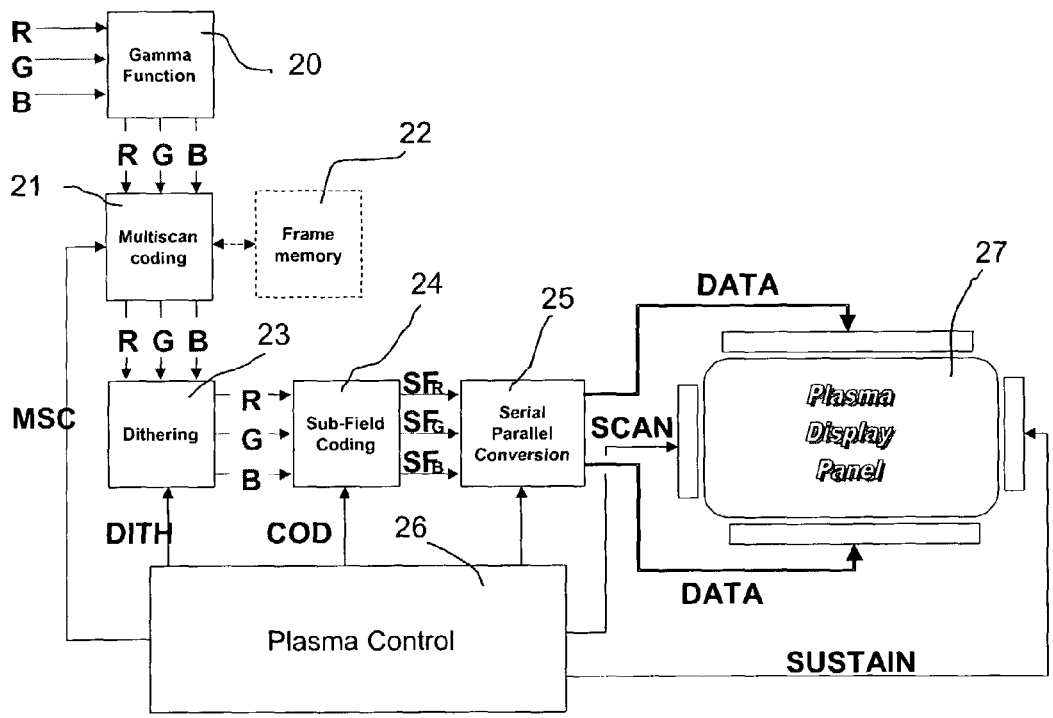
FIG. 7 a block diagram of a hardware implementation of the multiscan concept.

FIG. 7 describes a possible circuit implementation of the invention. RGB input video data is forwarded to the gamma function transformation unit 20: this can be a LUT or a software program for performing the mathematical function. The outputs of this block are forwarded to the multiscan coding block 21 that extracts the extra-codes, performs the resealing and outputs the new values of the sub-frames. The operation of the multiscan coding block 21 can be activated or deactivated with the MSC control signal generated by the plasma control block 26. E.g. if the input video signal is from a standard 60 Hz video source, the multiscan block 21 will be deactivated and if the input video signal is from a 100 Hz video source (e.g. PC) the multiscan block 21 is activated.

This multiscan coding block 21 can use an optional frame memory 22 when the extra-codes are extracted from the two sub-frames; but this can be avoided by extracting the extra-codes from one single sub-frame.

To the rescaled video values output of the multiscan block 21, the dithering values will be added in the dithering unit 23 and this can be configured via the DITH signal from the plasma control block 26.

The same block will configure the sub-field encoding block 24 to take into account or not that the multiscan mode is activated or not. The sub-field code words from the sub-field coding block 24 are further processed in the well known manner including serial parallel conversion in block 25 for line-wise driving of the PDP.

The present invention is applicable to all displays based on the principle of duty-cycle modulation (pulse width modulation) of light emission. In particular it is applicable to DMDs (digital micro mirror devices). It eliminates large area flicker artifacts from PDPs, when displaying 50 Hz based video norms and permits to display high frequencies on the PDP (e.g. 120 Hz) without frame dropping, particularly in the field of multimedia applications.

A number of modifications are possible that are considered to also fall under the scope of the invention. For example the algorithm to determine the extra codes as being disclosed is based on a pair-wise evaluation of pixels from two consecutive frames. This algorithm could be modified in a manner that more than two corresponding pixels are involved in the evaluation process for the two consecutive frames.

What is claimed:

1. Method for displaying video frames, wherein each video frame is displayed by activating pixels forming a display, and a sequence of said video frames is displayed with a main frame repetition frequency, wherein driving of the pixels is determined by video values in the video frame, characterized by the steps of extracting a portion of the video values for corresponding pixels in two successive video frames, thereby splitting the video values of the two corresponding pixels into a common portion and an individual portion, taking the common portion of the video values for driving a display with a reduced frame repetition frequency and taking the individual portion of the video values for driving the display with the main frame repetition frequency.

2. Method according to claim 1, wherein a threshold is provided that represents the maximum value for the common portion of the video values.

3. Method according to claim 1 or 2, wherein the video values for the pixels are converted into digital code words determining the length of the time period during which the pixel of the display is activated in one frame, wherein each bit of a code word corresponds to a certain activation duration of a sub-field, hereinafter called a sub-field weight, wherein for the activation of the pixels in two consecutive frames a sub-field organization is used in which there are arranged two groups of sub-fields for the individual portion of the video values of the corresponding pixels and at least one group of sub-fields for the common portion of the video values of the corresponding pixels in a time period equal to the length of two frame periods corresponding to the main frame repetition frequency.

4. Method according to claim 3, wherein the group of sub-fields for the common portion is positioned in the middle of the time period equal to the length of two frame periods corresponding to the main frame repetition frequency and the two groups of sub-fields for the individual portions are positioned in front and behind the sub-field group for the common portion.

5. Method according to claim 1, wherein the individual portions of the video values are rescaled before sub-field encoding to a value corresponding to the sum of the sub-field weights in the group of sub-fields for the individual portions of the video values.

6. Method according to claim 1, wherein the main frequency lies in the interval of 60 and 120 Hz.

7. Method according to claim 1, wherein said two frames are identical frames after upconversion to a higher frame rate.

8. Method according to claim 1, wherein in case that one of the video values of corresponding pixels is below the maximum value for the common portion, this low value defines the common portion.

9. Apparatus for carrying out the method according to claim 1 or 2, comprising multiscan coding means for partitioning the video values for corresponding pixels in two successive video frames into a common portion and an individual portion, and display driving means for displaying the common portion of the video values with a reduced frame repetition frequency and displaying the individual portions of the video values with the main frame repetition frequency.

10. Apparatus according to claim 9, further comprising sub-field coding means for the common portion and the individual portions and the display driving means driving the display during a frame period in individually controllable sub-fields, where a first group of sub-fields is dedicated to the individual portion of one pixel, a second group of sub-fields is dedicated to the common portion of born pixels and a third group of sub-fields is dedicated to the individual portion of the other pixel.

* * * * *

UNITED STATES PATENT AND TRADEMARK OFFICE
CERTIFICATE OF CORRECTION

PATENT NO. : 7,609,235 B2 Page 1 of 1
APPLICATION NO. : 10/424827
DATED : October 27, 2009
INVENTOR(S) : Thebault et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Twelfth Day of October, 2010

David J. Kappos
*Director of the United States Patent and Trademark Office*